W. E. LAWRENCE.

CURRY-COMB.

No. 7,055. Reissued April 11, 1876.

Witnesses:

John T. Spencer

Otis F. Pusey

W. E. Lawrence

Inventor.

By his atty

Charles E. Foster

N. PETERS, PHOTO-LITHOGRAPHER, WASHINGTON, D. C.

UNITED STATES PATENT OFFICE

WILLIAM E. LAWRENCE, OF NEW YORK, N. Y., ASSIGNOR TO THE LAWRENCE CURRY-COMB COMPANY, OF SAME PLACE.

IMPROVEMENT IN CURRY-COMBS.

Specification forming part of Letters Patent No. 157,010, dated November 17, 1874; reissue No. 7,055, dated April 11, 1876; application filed April 1, 1876.

*To all whom it may concern:*

Be it known that I, WILLIAM E. LAWRENCE, of the city, county, and State of New York, have invented an Improvement in Curry-Combs, of which the following is a specification:

The object of my invention is an improvement in curry-combs, whereby a grasp for the hand above the back of the comb is obtained, a cheap, strong, and durable attachment for side handles being also secured.

Figure 1:
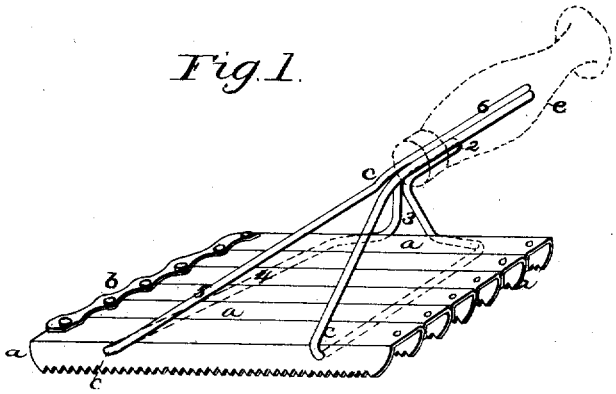
Figure 2:
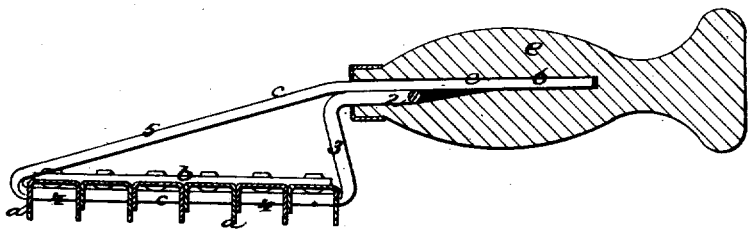

In the drawing, Figure 1 is a perspective view of the curry-comb, one of the knockers being removed; Fig. 2, a vertical longitudinal section.

*a a* are the comb-plates, formed as sheet-metal troughs, and these are connected at their ends by the knockers *b b*. The handle-wire *c* is bent double at 2, is spread at 3, and then passes in two parallel lines, at 4, through holes in the comb-plates *a*, and is returned above the back, as at 5, the ends 6 forming tines to be inserted into the wooden handle *e*. The double portion 2 also passes into the wooden handle, from which the different portions of the wire radiate to their points of connection with the comb, forming four arms, bars, or braces. It is preferable to retain the wires firmly within a pair of metal jaws, that are made to receive them while the handle is being driven upon such wires. The two bars 5 of the wire *c* extend above and across the comb at an angle to the direction of the comb-bars, affording a grasp above the back of the comb nearly at right angles to the bars. This grasp may be employed instead of the handle *e*, as in the comb patented to C. W. Saladee, March 7, 1865; and this is very convenient as a grasp or support for the hand in using the comb on some parts of the animal's body, because the hand is behind the comb-plates, and the handle *e* can stand in either direction, as may be most convenient.

In cases where the knockers or welts *b* at the ends of the comb-plates are adapted to receive the handle wire, I return such wires to the handle behind the comb-plates, and form braces and additional grasping-handles, as aforesaid.

I claim as my invention—

1. A curry-comb provided with a grasp or support above the back, consisting of two rods or bars extending above and across the back.

2. A curry-comb having two bars or rods extending at an angle to each other across and above the back, affording a means of grasping the comb, as set forth.

3. A curry-comb provided above the back with a rest or grasp for the hand, consisting of two bars extending above and across the back at an angle to the direction of the comb-bars.

4. A curry-comb in which a continuous wire extends from the handle through parts of the comb and back to the handle, substantially as set forth.

In testimony whereof I have signed my name to this specification in the presence of two subscribing witnesses.

WM. E. LAWRENCE.

Witnesses:

C. E. L. HOLMES,

W. C. LAWRENCE.